United States Patent

[11] 3,610,310

| [72] | Inventor | Hermann Wittneben<br>Hannover, Germany |
|---|---|---|
| [21] | Appl. No. | 816,522 |
| [22] | Filed | Apr. 16, 1969 |
| [45] | Patented | Oct. 5, 1971 |
| [73] | Assignee | Continental Gummi-Werke<br>Aktiengesellschaft<br>Hannover, Germany |
| [32] | Priority | Apr. 27, 1968 |
| [33] | | Germany |
| [31] | | P 17 55 335.4 |

[54] PNEUMATIC VEHICLE TIRE, ESPECIALLY SPARE TIRE
4 Claims, 1 Drawing Fig.

| [52] | U.S. Cl. | 152/352 |
|---|---|---|
| [51] | Int. Cl. | B60c 5/00 |
| [50] | Field of Search | 152/352, 330, DIG. 12 |

[56] References Cited
UNITED STATES PATENTS

| 3,347,300 | 10/1967 | Sidles | 152/352 |
| 3,400,746 | 9/1968 | Heimovics, Jr. | 152/352 |
| 3,540,510 | 11/1970 | Smithkey | 152/330 |

FOREIGN PATENTS

| 241,791 | 11/1962 | Australia | 152/352 |
| 749,754 | 5/1933 | France | 152/352 |
| 998,482 | 9/1951 | France | 152/352 |
| 418,293 | 10/1934 | Great Britain | 152/352 |

*Primary Examiner*—Arthur L. LaPoint
*Assistant Examiner*—Richard A. Bertsch
*Attorney*—Walter Becker ABSTRACT: A pneumatic vehicle tire, especially spare tire, which, when in deflated position on a wheel, has its sidewalls folded over the wheel flange so that the folded-over tire sidewall portion together with the adjacent bead portion will be U-shaped in cross section with the opening of the U directed toward the axis of rotation of said vehicle.

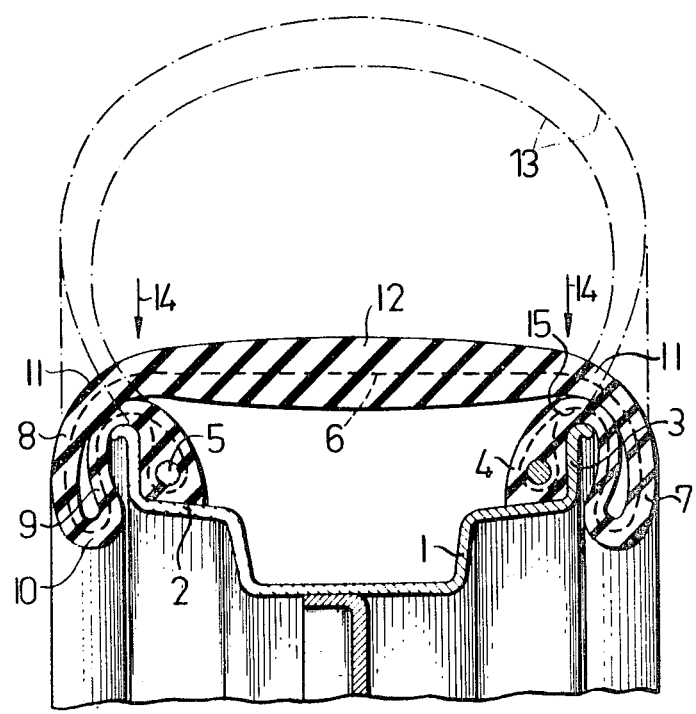

PNEUMATIC VEHICLE TIRE, ESPECIALLY SPARE TIRE

The present invention relates to a pneumatic vehicle tire, especially spare tire, with approximately U-shaped folded sidewalls and with a substantially cylindrical tread strip zone, which when the tire is to be placed into operation is by the tire inner pressure converted into a tire with a horseshoe-shaped cross section while elastically deforming its tread strip zone and stretching its sidewalls.

Accordingly, the tire when stored as spare tire has an outer diameter which is considerably less than the outer diameter of the tire when placed in operation so that the tire when stored as spare tire can together with its rim be stored in a minimum of space.

With heretofore known spare tires of the above-mentioned type, the tire sidewalls are folded inwardly in the direction toward the hollow chamber of the tire. The sections of the tire sidewalls which form the folds will at both sides of the tire strip zone form a circular depression. The shoulder area and the tread strip marginal zone of the not-yet-inflated tire therefore surround the sections of the lateral folds which in their turn surround the bead portions of the tire.

It is an object of the present invention to provide a pneumatic vehicle tire, especially spare tire, which in noninflated condition will have a considerably reduced diameter so as to require a minimum space.

It is another object of this invention to provide a tire as set forth in the preceding paragraph which will improve the emergency running properties of the tire.

These and other objects and advantages of the invention will appear more clearly from the following specification in connection with the accompanying drawing illustrating a tire according to the present invention mounted on a rim, which tire when being inflated for operation will assume the shape illustrated in dot-dash lines.

The pneumatic vehicle tire according to the present invention is characterized primarily in that the sections of the tire sidewalls which form the folds extend in the direction toward the main axis of the tire while, preferably, the folding is such that the sections extend perpendicularly or practically perpendicularly with regard to the main axis of the tire. Advantageously, the folds or the sections of the tire sidewalls forming said folds are arranged laterally outside adjacent the bead portions of the tire or that portion of the rim receiving said bead portions.

In contrast to heretofore known spare tires, the folds are no longer located between the tread strip zone and the bead portions of the tire but are arranged primarily laterally adjacent the bead portions so that the tread strip zone can be arranged in the immediate vicinity of the bead portions and the outer diameter of the spare tire can still be further reduced. In addition thereto, it is also possible, if necessary, to drive the spare tire without pressure inasmuch as the lateral areas of the tread strip are able to rest directly on the bead portions without being subjected to clamping or a destruction of the sensitive tire sidewalls. The emergency running properties may further be improved by providing cushioning rubber layers on the inner surfaces of the tire which are located above the bead portions and/or below the shoulder zones of the tire.

Referring now to the drawing in detail, the pneumatic tire of rubber or rubberlike material which is provided with embedded reinforcing inserts is mounted on a deep bed rim 1 of customary design with seating surfaces 2 and wheel flanges 3.

The tire beads 4 of the pneumatic tire have bead cores 5 of steel to which is anchored the carcass 6 of cord fabric, which carcass extends from bead to bead.

The tire sidewalls 7 re folded so as to form two sections 8 and 9 and a folding area 10. The sections 8 and 9 extend substantially perpendicularly with regard to the main axis of the tire and, more specifically, inwardly in the direction toward this axis. The folding area 10 is located on a diameter which is less than the diameter of the bead cores 5 or the diameter on which the seat surfaces 2 are located.

Adjacent to and above the tire beads 4, the sidewall is passed over the wheel flange. From there it merges into the section 8 which forms a portion directly merging with the shoulder areas 11 of the tread strip zone 12.

Therefore, the tread strip zone 12 is approximately cylindrical and has its marginal areas or shoulder areas 11 located directly on the sections of the sidewall of the tire which sections, in turn, engage the wheel flange.

When the spare tire is to be placed in operation, it has to be subjected to an inner pressure, as a result of which the tread strip zone 12 increases in diameter while the tire walls elastically deform. In conformity with the increase in the diameter of the tread strip zone 12, the tire sidewalls 7 are unfolded or stretched. When the prescribed tire inner pressure has been obtained, the tire will have a cross-sectional shape as indicated by the dot-dash lines 13 and will thus have the typical horseshoe cross-sectional shape common to ordinary pneumatic vehicle tires.

If it is desired to take the spare tire out of operation, the inner chamber of the tire is vented. The elastic stress previously introduced into the tire body will then return the tire to its original cross-sectional shape. This requires that the spare tire has been molded or vulcanized in the shape indicated by solid lines in the drawing or that at least during its molding or vulcanization the tire had a cross-sectional shape which approximately corresponds to the cross-sectional shape indicated by the solid lines in the drawing.

If at the time when the spare tire is to be placed into operation no source of compressed air is available or if the tire after inflation is perforated and then returns to its original shape, the tire can still be used with this shape. In such an instance the vehicle rests substantially in the direction of the arrows 14 upon the shoulder zones 11 of the pneumatic tire and through the intervention of the sections 15 of the tire sidewalls 7 below said shoulder zones 11 and closely above the beads 4 upon the wheel flanges 3. The sensitive sections 8 and 9 of the tire sidewalls, which are usually somewhat thinner, will with such emergency running practically not be subjected to any material stresses.

For purposes of improving these emergency running properties, the pneumatic tire may at its inner surface, and more specifically within the two shoulder areas and closely above the tire bead 4 within the region of the wheel flanges 3, be provided with special rubber layers which will assure a certain elastic cushioning and which will protect the reinforcing inserts of the carcass 6 which are located in these areas of the tire wall.

The carcass 6 must be able to expand and permit the changes in diameter indicated in the drawing. For this reason, it is expedient for the carcass 6 to employ intercrossing cord threads which must be pull-resistant but should permit a change in the angle which they form with each other to allow the desired changes in diameter.

It is, of course, to be understood, that the present invention is, by no means, limited to the specific showing in the drawing, but also comprises any modifications within the scope of the appended claims.

What I claim is:

1. A pneumatic tire adapted to be installed on a wheel rim and to be inflated to tire shape of horseshoe cross section, comprising beads with bead cores, and, in deflated condition, foldable, extensible elastic sidewalls and an approximately cylindrical, extensible elastic tread strip, each of said sidewalls, when said tire is mounted on a rim, being folded over outside of the flange of the rim to form a folded portion U-shaped in cross section extending circumferentially about each side of the rim, and said tread strip having an internal diameter approximately the diameter of said rim flanges increased by the thickness of said sidewalls on diametrically opposite sides of the rim, so that said tread strip rests on the sidewalls folded over said flanges, and said tread strip and sidewalls being extended by inflation of the tire to assume the horseshoe shape in cross section, with the tread strip of substantially increased diameter and the sidewalls extending substantially radially outward from said beads.

2. A vehicle tire according to claim 1 which includes cushioning means interposed between said wheel flanges and the respective sidewall portion folded thereover, said cushioning means being connected to said last-mentioned elastically folded-over sidewall portion so that thinner more sensitive and elastic sections of the tire sidewalls during emergency spare tire running are kept from being subjected to any material stresses.

3. A pneumatic tire adapted to be installed on a wheel rim and to be inflated to tire shape of horseshoe cross section, comprising beads with bead cores, and, in deflated condition, foldable, extensible sidewalls and an approximately cylindrical, extensible tread strip, each of said sidewalls, when said tire is mounted on a rim, being folded over the side flanges of the rim to form a folded portion U-shaped in cross section extending circumferentially about each side of the rim with the bight of the U-shape toward the axis of the wheel rim, said tread strip having an internal diameter approximately the diameter of the rim flanges increased by the thickness of the sidewalls on opposite sides of the rim, and said tread strip and sidewalls being extended by inflation of the tire to assume the horseshoe shape in cross section, with the tread strip of substantially increased diameter and the sidewalls extending substantially radially outward from said beads.

4. A pneumatic tire as claimed in claim 3, in which the bight of each U-shaped portion has a diameter less than the diameter of a bead.